July 16, 1963 J. G. CRUMP 3,098,154
TANK LEVEL MEASUREMENT SYSTEM
Filed Dec. 15, 1958

INVENTOR
Jack G. Crump
By Anthony D. Gennamo

United States Patent Office 3,098,154
Patented July 16, 1963

3,098,154
TANK LEVEL MEASUREMENT SYSTEM
Jack G. Crump, Columbus, Ohio, assignor to Industrial Nucleonics Corporation, a corporation of Ohio
Filed Dec. 15, 1958, Ser. No. 780,501
6 Claims. (Cl. 250—43.5)

This invention relates to a radiation measuring system and more particularly to an improved method and means for determining the fill level of tank or containers.

Many so-called tank fill level gauges are presently known including those that use a nuclear radiation source. Further, there are tank fill level gauges that employ the basic principle of placing a nuclear radiation source on the outside wall of the tank and radiation detector on the outside of the directly opposite wall.

One of the primary disadvantages of these systems is that due to non-linearity, true measurement may be had only over a very small percentage of the overall range. A suggested answer is to employ an elongated source and an elongated detector as the measuring means. For obvious reasons, such as, health safety, cost and feasibility this has not proven to be the solution.

The present invention is a tank fill level measuring system employing a point source of nuclear radiation with an elongated detector, the source and detector being placed on the outside of opposite walls. The linearity of the detector output is corrected in a novel manner to render the system useful over the range of measurement.

It is accordingly, an object of the present invention to provide a new and improved level measuring system.

It is a further object of the present invention to provide a level measuring system that employs a point source and elongated detector without the inherent non-linearity.

It is another object of the present invention to provide a level measuring system that is readily adaptable to the containers in use, that is completely external, has no contact with the material, is rugged and reliable and has a diversity of applications.

Further objects and features of the present invention will become apparent from the detailed description taken in conjunction with the drawings in which:

FIG. 1 graphically illustrates the non-linearity of tank level measuring system.

Figure 6:
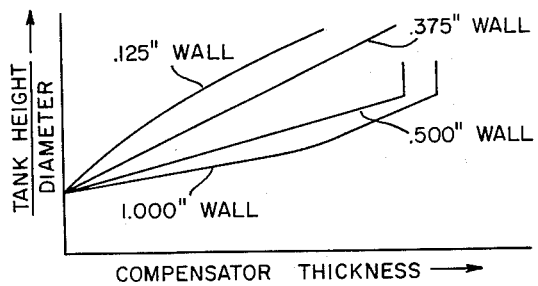

FIG. 6 graphically illustrates the size absorber required for various tank walls and $$\frac{\text{tank height}}{\text{diameter}}$$

ratios.

It is to be understood that by point source is meant that radiations emanate from a source at a single point as distinguished from an elongated source or a source spread over a broader area. Similarly by an elongated detector is meant a detector capable of receiving radiations over an extended area.

In measuring the fill level in a tank using a single or point radiation source placed at the upper tank level and an elongated radiation detection means positioned at a right angle to the level change, it is apparent that the rate of change of radiation as viewed at the detector will diminish as the tank level is reduced. However, it has also been found that the detector response as related to tank fill is non-linear. There is graphically depicted in FIG. 1 the extent of non-linearity in the percentage of radiation received versus percentage of tank fill as related to three conditions of measurement; curve A, is for a ratio of length of measurement of tank fill to diameter of .5; curve B, is a ratio of 1.0; and curve C, for a ratio of 1.5. It is apparent from these curves that as the ratio becomes larger, the extent of non-linearity increases.

Figure 1:
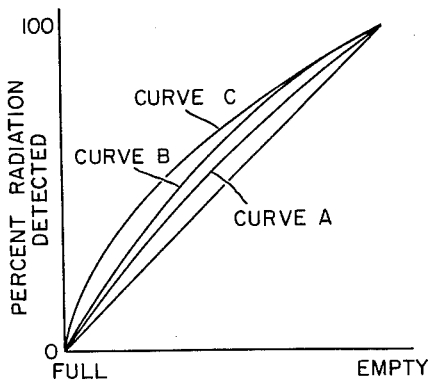
Figure 2:
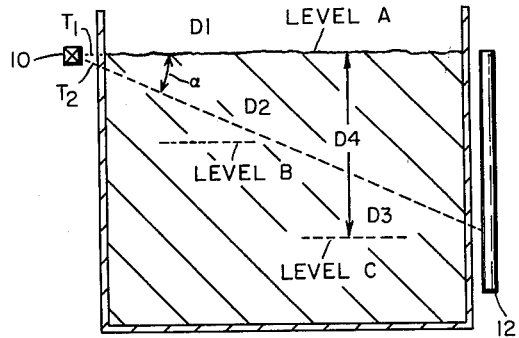
FIG. 2 illustrates the radiation paths taken in a conventional tank level measuring system.

The non-linearity as noted in FIG. 1 may be attributed to the fact that the incremental distance from the source to the detector is a variable and increases with a lowering level in the tank. The radiation received at the detector decreases as described by the square law effect; resulting in a smaller charge in radiation per unit change in fill. Graphically this is shown on FIG. 2 in which as angle $a$ becomes greater, the incremental distance D from the source 10 to the detector 12 increases. Another factor is that the radiation path length through the tank product decreases with a lowering of level thus causing a non-linear radiation change per unit change in fill. The magnitude of this effect is in turn related to the size of the tank and becomes more pronounced with smaller diameters. FIGURE 2 also shows that as the level changes from level A to level B the path length of the radiation through the tank product decreases from D1 to D3. Finally, the tank wall 21 thickness as seen by the radiation source 10 is related to the angle between the full level A and the measured level B. The wall distance T increases to over double its value in a tank where D4 equals 2D1. In thicker walled vessels the effect of tank wall variation with height of measurement almost precludes the possibility of readout linearization.

Figure 3:
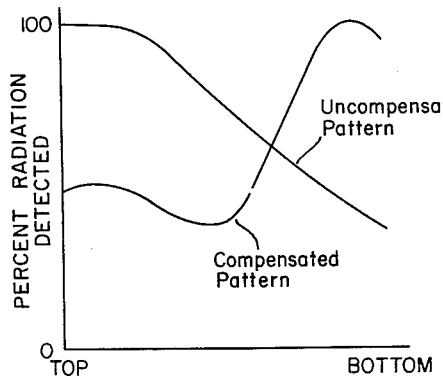
FIG. 3 illustrates graphically the radiation patterns of a compensated and non-compensated radiation source.

The present invention teaches linearity compensation by the use of a compensating absorber positioned between the source 10 and the detector 12. The shape of this compensator is such that the radiation field at the detector will cause a linear change in counts for an equivalent change in level. A reading of the radiation intensity along the region of measurement for an empty tank with and without compensation is shown on FIG. 3. The uncompensated pattern shows a maximum radiation measurement at the top of the tank dropping off substantially towards the tank bottom. The opposite is true in the compensated pattern which shows low radiation at the tank top and high radiation at the tank bottom. The greater radiation is required at the lower tank limits so as to increase the magnitude of radiation change with level change thus compensating for the reduced tank product absorber path length seen by the radiation as the level in the tank is lowered.

Figure 4:
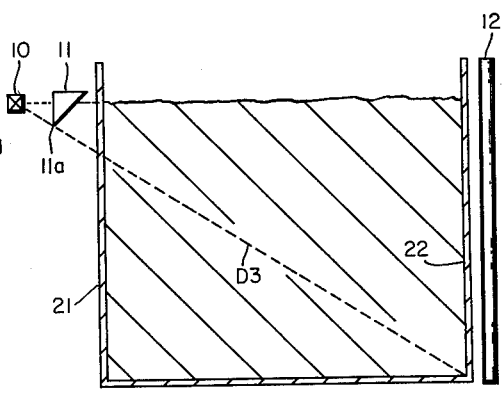
FIG. 4 is a typical embodiment of the present invention.

A typical constructed embodiment to relate the relative position of the source, detector, and compensator is shown in FIG. 4. The source 10 and top edge of the detector 12 are positioned at the top level of measurement of tank 12. The compensator 11 of the present invention is positioned directly between the source 10 and tank wall 21. The compensator 11 in this instance comprises a steel block whose dimensions were empirically chosen for the size of the tank, that is, the low edge 11a is designed to be positioned on a line D3 joining the source 10, and low level of desired measurement as seen from the opposite wall 22. The compensator 11 may be bolted directly to the tank wall or alternately may form a part of the source 10 housing.

Figure 5:
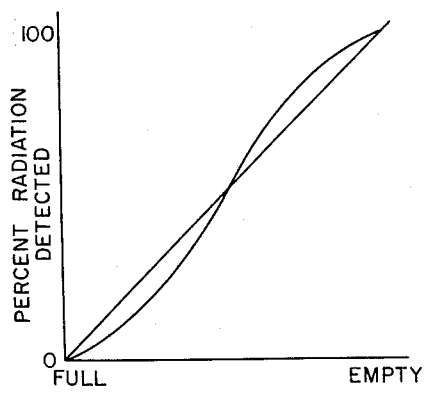
FIG. 5 is a graphical illustration of the present invention.

In order to determine the optimum shape of the compensating absorber 11 tests were conducted using a 45° angled steel block positioned as shown in FIG. 4 and absorbers of other geometries varying between 15°–75°. A typical compensation curve using a 45° block is shown on FIG. 5 and can be compared with the equivalent uncompensated curve on FIG. 1. The limiting factor in using the angular shaped compensator was noted in attempting to applicate them on heavier walled tanks. Under this condition the effectiveness of the compensation degenerated. A rectangularly shaped compensator positioned as shown on FIG. 4 proved to be the most satisfactory and was finally selected as the best solution for a simple compensating means.

The thickness of the compensating absorber required for various size tanks and tank walls was determined and an optimum was obtained by bracketing the test values. This data has been accumulated and averaged for the various tank diameters and is shown on FIG. 6 as a family of curves with the ratio of height of level measurement over tank diameter versus compensator thickness. From this data it is apparent that as the wall thickness of the tank increases, the amount of compensation required becomes greater. A practical limit is approached with tanks greater than 1" wall. Not only is the linearizing effect of the compensation decreased but likewise the amount of radiation received at the detector is appreciably reduced, thus increasing the readout statistics. In measurement ratios greater than 1.5 increasing the compensation thickness for the linear wall tanks had no apparent additional linearizing effect. Another modification of the present invention may be had placing the compensating block 11 on the opposite wall 22, that is, between wall 22 and the detector 12. In those instances where a relatively flat sheet of absorbing material has been calculated to be the optimum shape this positioning may be preferred.

Other modifications may be had without departing from the spirit and scope of the invention.

What is claimed is:

1. Apparatus for determining the fill level of a container which comprises a point source of penetrative radiation fixedly positioned on the outside of said container and in line with the uppermost level of said fill, an elongated radiation detector fixedly positioned on the opposite side of said container at a right angle to said fill and of a length approximating the distance between the upper and lower levels of said fill; and a compensation means positioned between said source and said detector for linearly changing the radiation received by said detector for an equivalent change in fill level.

2. Apparatus for determining the fill level of a container which comprises a point source of penetrative radiation fixedly positioned on the outside of said container and in line with the uppermost level of said fill, an elongated radiation detector fixedly positioned on the opposite side of said container at a right angle to said fill and of a length approximating the distance between the upper and lower levels of said fill; and a linearity compensating absorber mounted between said point source and said elongated detector.

3. Apparatus for determining the fill level of a container which comprises a point source of penetrative radiation fixedly positioned on the outside of said container and in line with the uppermost level of said fill, an elongated radiation detector fixedly positioned on the opposite side of said container at a right angle to said fill and of a length approximating the distance between the upper and lower levels of said fill; and a linearity compensating absorber mounted between said point source and said containers.

4. Apparatus for determining the fill level of a container which comprises a point source of penetrative radiation fixedly positioned on the outside of said container and in line with the uppermost level of said fill, an elongated radiation detector fixedly positioned on the opposite side of said container at a right angle to said fill and of a length approximating the distance between the upper and lower levels of said fill; a linearity compensating absorber being of a dimension and so mounted between said point source and said elongated detector that the lower edge of said absorber is in line with said source and the low level of measurement.

5. In combination with a container fillable to a maximum level with material, level measuring apparatus comprising a source of radiation positioned at one side of said container at said maximum level providing a beam of radiation, an elongated detector for said radiation at the opposite side of said container, and beam compensating means mounted between said source and said material for linearly changing the radiation at said detector in proportion to a change in said material fill level.

6. The subcombination set forth in claim 5 in which said beam compensating means comprises a radiation translucent absorber having a triangular cross-section in the vertical plane with the upper portion thereof extending toward said detector.

References Cited in the file of this patent

UNITED STATES PATENTS

| 2,412,662 | Watson | Dec. 17, 1946 |
| 2,506,342 | Burke | May 2, 1950 |
| 2,714,167 | Herzog | July 26, 1955 |
| 2,737,592 | Ohmart | Mar. 6, 1956 |
| 2,817,764 | Jacobs et al. | Dec. 24, 1957 |
| 2,828,422 | Steierman | Mar. 25, 1958 |
| 2,858,449 | Burr | Oct. 28, 1958 |
| 2,877,352 | Weigel et al. | Mar. 10, 1959 |
| 2,906,878 | Goodman | Sept. 29, 1959 |